United States Patent [19]

Trivedi et al.

[11] Patent Number: 4,830,989

[45] Date of Patent: May 16, 1989

[54] ALKALI-RESISTANT GLASS FIBER

[75] Inventors: Nikhil C. Trivedi, Easton, Pa.; John D. Mackenzie, Los Angeles, Calif.

[73] Assignee: Pfizer Inc., New York, N.Y.

[21] Appl. No.: 161,258

[22] Filed: Feb. 22, 1988

Related U.S. Application Data

[63] Continuation of Ser. No. 867,827, May 28, 1986, abandoned.

[51] Int. Cl.$^4$ .................. C03C 13/00; C04B 14/22; C04B 14/44
[52] U.S. Cl. .......................... 501/35; 501/38; 501/72; 106/99; 428/375; 428/392; 65/3.41; 65/3.43; 65/3.44
[58] Field of Search .............. 428/392, 375; 501/38, 501/35, 72; 106/99; 65/3.41, 3.43, 3.44

[56] References Cited

U.S. PATENT DOCUMENTS

| | | | |
|---|---|---|---|
| 1,842,772 | 1/1932 | Veress | 501/72 |
| 3,854,986 | 12/1974 | Chvalovsky et al. | 117/126 GS |
| 3,904,423 | 9/1975 | Guthrie | 106/50 |
| 3,928,049 | 12/1975 | Otouma et al. | 501/38 |
| 4,002,482 | 1/1977 | Coenen | 501/72 |
| 4,106,946 | 8/1978 | Ritze | 501/72 |
| 4,363,878 | 12/1982 | Yamamoto et al. | 106/99 |

FOREIGN PATENT DOCUMENTS

| | | |
|---|---|---|
| 255803 | 12/1960 | Australia . |
| 35805 | 4/1968 | Australia . |
| 63572 | 12/1973 | Australia . |
| 0076677 | 4/1983 | European Pat. Off. . |
| 2361195 | 7/1974 | Fed. Rep. of Germany . |
| 51-13819 | 2/1976 | Japan . |
| 107309 | 9/1976 | Japan .................. 501/38 |
| 55-3367 | 1/1980 | Japan . |
| 57-166359 | 10/1982 | Japan . |
| 60643 | 4/1983 | Japan .................. 501/35 |
| 8401365 | 4/1984 | PCT Int'l Appl. . |
| 1227355 | 4/1971 | United Kingdom . |

OTHER PUBLICATIONS

Ceramic Industry, Jan. 1986, vol. 126, No. 1, pp. 104, 120, 130.

Kokubu et al., Kagoshiima-ken Koggo Shikenjo Nempo, 21, 21–3 and 24–7 (1974) (with translation).

*Primary Examiner*—Mark L. Bell
*Assistant Examiner*—Ellen M. McAvoy
*Attorney, Agent, or Firm*—Peter C. Richardson; Lawrence C. Akers; Howard R. Jaeger

[57] ABSTRACT

A continuous, monofilamentous, alkali-resistant glass fiber especially useful in cementitious products is conveniently prepared from a glass-forming composition comprising a magnesium silicate such as talc and a calcium carbonate such as limestone. Either the fiber itself or a strand comprising a plurality of the fiber is advantageously coated with an alkali-resistant polymer such as butadiene-styrene to provide additional alkali resistance.

33 Claims, No Drawings

ALKALI-RESISTANT GLASS FIBER

This is a continuation of application Ser. No. 867,827, filed on May 28, 1986, now abandoned.

BACKGROUND OF THE INVENTION

This invention concerns a novel alkali-resistant glass fiber having silica, magnesia and calcia as its major components, and its preparation from readily available minerals.

Alkali-resistant glass fibers are finding increased acceptance, particularly in cementitious products where their inclusion improves the mechanical properties of such products. These improved properties permit thinner, lighter cement structures to be used as, for example, prefabricated decorative panels in cladding the outside of buildings.

Ordinary glass fibers cannot be used in cement, since such a highly alkaline environment tends to attack and deteriorate the glass. To overcome this drawback, new glass compositions with high alkali resistance have been developed. Present commercial alkali-resistant glass fibers are drawn primarily from compositions containing predominately silica but with zirconia at levels often as high as 25 weight percent as the key component. While the high zirconia content allows the glass to be continuously fiberized to small diameters and yet remain alkali-resistant, such glasses containing this expensive component require the use of high melting and fiberizing temperatures.

It is therefore a primary objective of the present invention to provide a glass composition derived from relatively inexpensive mineral sources which is highly alkali-resistant but which can be readily drawn into continuous monofilaments at reasonable operating temperatures.

Prior attempts at providing such an alkali-resistant glass fiber include that disclosed in Published European patent application No. 76,677 in which a fiber is formed from a composition containing from 20 to 30 weight percent CaO, 15 to 20 percent MgO, and the balance $SiO_2$ using diopside alone or in combination with up to 10 percent sandstone or quartz or up to 20 percent dolomite. In Published International (PCT) patent application No. WO 84/01365, alkali-resistant glass compositions purportedly suitable for use as glass fibers are prepared from naturally-occurring pre-reacted zeolite admixed with a significant quantity of alkaline earth metal-containing material such as calcium carbonate. Japanese Kokai No. 13819/76 discloses an alkali-resistant composition for glass fiber formation consisting of 42 to 66 weight percent silica, 5 to 30 percent magnesia and 5 to 50 percent calcia. Other glass compositions for use in preparing alkali-resistant fiber which contain a major portion of alkaline earth oxide include those disclosed in U.S. Pat. Nos. 3,854,986 and 3,904,423, British Pat. No. 1,227,355, West German Offen. No. 2,361,195, Japanese Kokai No. 107309/76, 3367/80, and 166359/82, and by Kokubu et al, Kagoshima-ken Kogyo Shikenjo Nempo, 21, 21-3 and 24-7 (1974). Despite these approaches, however, the need still exists for an improved, simplified composition for producing the desired fiber.

SUMMARY OF THE INVENTION

The stated objective is realized with the presently disclosed process for preparing an alkali-resistant glass fiber, which comprises heating a mixture comprising a magnesium silicate and a CaO-containing compound, or calcium silicate and a MgO-containing compound, to above the liquidus temperature of the mixture to form a viscous liquid, drawing the viscous liquid to form a fiber, and cooling the fiber below the liquidus temperature.

Preferred is a process wherein the mixture contains from about 30 to 63 weight percent magnesium silicate, from 0 to about 47 weight percent silica, from about 21 to 45 weight percent calcium carbonate, and from about 5 to 20 weight percent of an oxide selected from the group consisting of lithium oxide, potassium oxide, sodium oxide, barium oxide, cadmium oxide, lead monoxide, strontium oxide, zinc oxide, alumina, boric oxide, ceric oxide, stannic oxide, titania, zirconia, antimony pentoxide, niobium pentoxide, phosphoric pentoxide and tantalum pentoxide, or a combination thereof, any single oxide from the group being added in a maximum amount of about 10 weight percent, especially wherein the magnesium silicate is in the form of talc, the silica is in the form of sand, and the calcium carbonate is in the form of limestone.

With such a preferred process, the viscous liquid may be readily drawn through an orifice to form a continuous fiber, and a plurality of the cooled continuous fiber formed into a strand. While the compositions of this invention are inherently alkali resistant, the cooled continuous fiber and/or the strand may be coated with a layer of alkali-resistant polymer to provide additional alkali resistance, the polymer preferbly being selected from ethylene-vinyl chloride and butadiene-styrene.

The present invention also includes a glass-forming composition having high alkali resistance when formed into a glass body, which comprises a magnesium silicate admixed with a CaO-comtaining compound or a calcium silicate admixed with a MgO-containing compound. Preferably, the composition consists essentially of from about 30 to 63 weight percent magnesium silicate, from 0 to about 47 weight percent silica, from about 21 to 45 weight percent calcium carbonate, and from about 5 to 20 weight percent of an oxide selected from the group consisting of lithium oxide, potassium oxide, sodium oxide, barium oxide, cadmium oxide, lead monoxide, strontium oxide, zinc oxide, alumina, boric oxide, ceric oxide, stannic oxide, titania, zirconia, antimony pentoxide, niobium pentoxide, phosphoric pentoxide and tantalum pentoxide, or a combination thereof, any single oxide from the group being present in a maximum amount of about 10 weight percent.

The present invention further embraces a continuous, monofilamentous, alkali-resistant glass fiber, which comprises a glass consisting essentially of, in approximate weight percent:

| | |
|---|---|
| $SiO_2$ | 30–65 |
| MgO | 12–18 |
| CaO | 12–18 |
| minor oxides | 5–20 | the minor oxides being selected from $R^a_2O$, $R^bO$, $R^c_2O_3$, $R^dO_2$ and $R^e_2O_5$
wherein
$R^a$ = Li, K, Na,
$R^b$ = Ba, Cd, Pb, Sr, Zn,
$R^c$ = Al, B,
$R^d$ = Ce, Sn, Ti, Zr, $R^e$ = Sb, Nb, P, Ta, and
wherein a single minor oxide is present in up to about 10 weight percent of the glass.

Preferably, the fiber is from a glass containing from about 55 to 60 weight percent $SiO_2$, from abut 14 to 16 weight percent MgO and from about 14 to 16 weight percent CaO, and the minor oxides are selected from $Na_2O$, $Al_2O_3$, $CeO_2$, $TiO_2$ and $Ta_2O_5$, a single minor oxide being from about 2 to 6 weight percent of the glass. Especially preferred in such a glass containing from about 2 to 4 weight percent $Na_2O$, from about 4 to 6 weight percent $Al_2O_3$ and from about 3 to 5 weight percent $TiO_2$.

The present invention still further contemplates a fiber-reinforced cementitious product containing the presently disclosed uncoated or coated glass fiber, especially such a product wherein the fiber constitutes from about 2 to 10 weight percent of the total solids in the product.

DETAILED DESCRIPTION OF THE INVENTION

The present invention permits the ready preparation of a continuous, monofilamentous, alkali-resistant glass fiber from a glass composition in which the major constituents are supplied by abundantly occurring minerals such as sand, talc and limestone, the temperature required for drawing the fiber being considerably below that employed with currently available high zirconia glass fibers.

By continuous fiber is meant a fiber that can be produced as a monofilament of essentially constant diameter in infinite length, in contrast to the short-length glass wool fiber commonly produced by spinning techniques. This continuous fiber will normally have a nominal diameter of from about 2 to 50 microns, preferably 10 to 20 microns.

While the present process is capable of producing either a continuous fiber or a glass wool fiber, preparation of the continuous fiber is of primary consideration.

The glass composition of this continuous fiber has silica ($SiO_2$), magnesia (MgO) and calcia (CaO) as its major components, with minor amounts of other metal oxides. The $SiO_2$ constitutes about 30 to 65 weight percent of the glass, while the MgO and CaO are present at about 12 to 25, preferably 12 to 18, weight percent each and the combined minor oxides at about 5 to 20 weight percent with no one minor oxide exceeding about 10 weight percent.

The $SiO_2$ in the glass may be supplied by free silica, by the magnesium silicate used to provide the MgO content of the glass as described below, by calcium silicate, or by a combination of either or both of these silicates and free silica. Any free silica may be used, with sand being preferred. While the MgO content of the glass may be provided by free magnesia such as seawater magnesia, by magnesium hydroxide, or by magnesium carbonate, magnesium silicate as employed in the present process is preferred. Any magnesium silicate, including olivine, serpentine and forsterite, may be used, talc being preferred. The CaO content of the glass will normally be provided by limestone, although other forms of calcium carbonate as well as the calcium silicate (wollastonite) mentioned above, calcium oxide and calcium hydroxide may be used. Dolomitic limestone, for example, might serve as a source for both the MgO and CaO.

The minor oxides, present in a minimum of about 5 weight percent of the glass, help to provide the proper viscosity for suitable drawing of the glass at its liquidus temperature and to minimize any tendency of the glass to crystallize and/or phase separate. These oxides include $R^a_2O$ and $R^bO$ in which $R^a$ is lithium, potassium or sodium, $R^b$ is barium, cadmium, lead, strontium or zinc, added to lower the melting temperature of the glass; and $R^c_2O_3$, $R^dO_2$ and $R^3_2O_5$ in which $R^3$ is aluminum or boron, $R^d$ is cerium, tin, titanium or zirconium, and $R^e$ is antimony, niobium, phosphorus or tantalum, added to in general increase the viscosity of the glass at its liquidus temperature, $R^dO_2$ and $R^e_2O_5$ also providing additional alkali resistance to the glass. Adjustment of these minor oxides between their combined limits of about 5 to 20 weight percent of the glass therefore provides a certain flexibility in the operating conditions for producing the continuous glass fiber.

The glass composition may also contain very small amounts (up to 2 weight percent) of other oxides, including colorant oxides such as $V_2O_5$, $Cr_2O_3$, CuO, NiO and CoO that help absorb infra red radiation, which do not affect the desired properties of the glass.

In preparing an alkali-resistant glass fiber by the general process of the present invention, a glass-forming composition comprising a magnesium silicate admixed with a CaO-containing compound, a calcium silicate admixed with a MgO-containing compound, or a combination of the magnesium and calcium silicates, is heated to a temperature above the liquidus temperature of the composition to form a viscous liquid. The liquid is then drawn, such as through an orifice to form a continuous fiber or by spinning to form a glass wool fiber, and the resulting fiber cooled to below the liquidus temperature.

The production of a continuous, monofilament fiber requires preparing a mixture of from about 30 to 63 weight percent magnesium silicate, from 0 to about 47 weight percent silica, from about 21 to 45 weight percent calcium carbonate, and from about 5 to 20 weight percent of a minor oxide selected from lithium oxide, potassium oxide, sodium oxide, barium oxide, cadmium oxide, lead monoxide, strontium oxide, zinc oxide, alumina, boric oxide, ceric oxide, stannic oxide, titania, zirconia, antimony pentoxide, niboium pentoxide, phoshporic pentoxide and tantalum pentoxide, or any combination thereof, any single minor oxide being added in a maximum amount of about 10 weight percent, and heating the mixture to a temperature above the liquidus temperature of the mixture to form a viscous liquid. The viscous liquid is then drawn through an orifice to form the fiber, and the fiber is cooled below the liquidus temperature. The liquidus temperature of the mixture will be from about 900° to 1400° C. for its compositional range, and the mixture will normally be heated to from about 100° to 300° C. above the liquidus to effect the melt, then cooled to a temperature above the liquidus giving a melt viscosity of from about 100 to 2000 poise. The melt is then extruded either by gravity or under pressure through an orifice, normally of 2 to 10 millimeter diameter, to produce the desired monofilament fiber of 10 to 50 microns diameter. The fiber is cooled to well below its liquidus temperature, normally by a countercurrent gas stream, and wound on a continuous roll.

Before being wound, the cooled continuous fiber is preferably coated with a layer of an alkali-resistant polymer using a standard coating technique, such as by passing the fiber over a sponge saturated with a solution of the polymer and then allowing the solvent to evaporate and the polymer to cure. This coating provides additional alkali resistance to that inherent in the glass fiber itself. While any alkali-resistant polymer may be used butadiene-styrene and ethylene-vinyl chloride are preferred. The polymer coating will normally be from about 2 to 20 weight percent of the coated fiber and have a thickness of from about 0.2 to 2 microns.

The monofilament fiber, either uncoated or coated, may be formed into a strand by conventional techniques, and the strand in turn may be polymer coated by such means as detailed above. Such strand will normally comprise from about 100 to 2000 individual fibers.

The resulting fiber, either uncoated or coated and preferably in strand form, is particularly suitable as a reinforcing agent in such a cementitious products which have a highly alkaline environment. In such products, the fiber will normally be present at a level of from about 1 to 20, especially 2 to 10, weight percent of the product. The fiber is added to the product by known techniques.

The following examples are merely illustrative and are not to be construed as limiting the invention, the scope of which is defined by the appended claims.

EXAMPLE 1

A mixture of 12.67 g talc[1], 7.75 g floated silica[2], 4.83 g limestone[3], 1.58 g powdered zirconia[2], 1.58 g powdered alumina[2] and 1.58 g powdered tin oxide[2] (equivalent to, by weight, 55.3% $SiO_2$, 14.3% MgO, 14.5% CaO, 5.3% $Al_2O_3$, 5.3% $ZrO_2$ and 5.3% $SnO_2$) was blended in a V-blender for 30 minutes, transferred to a platinum crucible and heated in an electric heating furnace at 1600° C. for 3 hours. During the melt, the mixture was stirred twice at 1-hour intervals. The resulting molten glass was cast into marble form. The glass marbles were transferred to a platinum bushing having a bottom orifice of 2.0 mm diameter, and the bushing placed inside an electric furnace. The glass was reheated to a temperature of 1360° C., at which the glass had a viscosity of about 1000 poise. A continuous glass fiber was then drawn from the molten glass by pulling a very fine stream of the molten glass through the orifice of the bushing, cooling the resulting fiber to below 200° C. by counter-current air flow, and attaching the cooled fiber onto a rotating drum, the fiber diameter being controlled by the drawing temperature and the rate of drum rotation. In this manner a continuous, monofilament fiber having a diameter of about 10 microns was obtained from the molten glass.
[1]Microtalc CP 14-35 ($SiO_2$ 54.7%, CaO 7.05%, MgO 26.8%, $Al_2O_3$ 1.06%, $Na_2O$ 0.04%, $Fe_2O_3$ 0.47%, $K_2O$ 0.49%, loss on ignition 0.04%, particle size 90% <1 micron) Pfizer Inc., New York, NY
[2]AR (99.5+%), Fisher Scientific Co., Fair Lawn, NJ
[3]Vicron 15-15 ($SiO_2$ 0.5%, CaO 54.7%, MgO 0.62%, $Al_2O_3$ 0.1%, $Na_2O$ 0.35%, $Fe_2O_3$, 0.02%, $K_2O$ 0.01%, loss on ignition 43.61%, particle size 90% <15 microns), Pfizer Inc., New York, NY

EXAMPLE 2

The procedure of Example 1 was repeated using a mixture of 12.58 g talc, 7.79 g floated silica, 4.89 g limestone, 1.61 g powdered alumina, 1.65 g powdered sodium carbonate[1], 1.04 g powdered titania[1] (equivalent to, by weight, 57.3% $SiO_2$, 14.8% MgO, 14.6% CaO, 5.9% $Al_2O_3$, 3.6% $Na_2O$, 3.8% $TiO_2$), resulting in a continuous, monofilament alkali-resistant glass fiber of 10-micron diameter.
[1]AR (99.5+%), Fisher Scientific Co.

A similar continuous, monofilament, alkali-resistant glass fiber is obtained from a mixture equivalent to, by weight, 62.0% $SiO_2$, 14.0% MgO, 18.0% CaO, 4.0% $Li_2O$ and 20% $P_2O_5$, or a mixture equivalent to 41.0% $SiO_2$, 18.0% MgO, 21.0% CaO, 7.0% $K_2O$, 7.0% $B_2O_3$ and 6.0% $Nb_2O_5$.

EXAMPLE 3

The procedure of Example 1 was repeated using a mixture of 13.35 g talc, 8.16 g floated silica, 5.1 g limestone, 1.68 g powdered alumina, and 1.71 g powdered sodium carbonate (equivalent to, by weight, 59.8% $SiO_2$, 15.4% MgO, 15.6% CaO, 5.7% $Al_2O_3$ and 3.4% $Na_2O$), resulting in a continuous, monofilament, alkali-resistant glass fiber of 10 micron diameter.

A similar continuous, monofilament, alkali-resistant fiber is obtained from a mixture equivalent to, by weight, 64.0% $SiO_2$, 12.0% MgO, 12.0% CaO, 6.0% BaO and 6.0% $CeO_2$, or a mixture equivalent to 32.0% $SiO_2$, 25.0% MgO, 25.0% CaO, 6.0% CdO, 6.0% SrO and 6.0% ZnO.

EXAMPLE 4

The procedure of Example 1 was repeated with the exception that the cooled fiber at about 200° C. was drawn over a felt soaked with a hexane solution of styrene-butadiene copolymer[1] the solvent allowed to evaporate and the polymer to cure before the fiber was coiled on the rotating drum. This resulted in a coated fiber with a 1 micron layer of butadiene-styrene polymer representing 20 weight percent of the coated fiber.

The coating operation may be repeated using an ethylene-vinyl chloride polymer[2] rather than butadiene-styrene with similar results.
[1]Kraton ®, Shell Chemical Co., Houston, TX
[2]Airflex ®, Air Products and Chemicals, Inc., Allentown, PA

EXAMPLE 5

The fiber of Example 1 and the styrene-butadiene coated fiber of Example 4 were compared with a commercially available alkali-resistant fiber[1] using standard tensile[2], alkali durability[3], and Strand-In-Cement (SIC)[4] testing procedures, with the following results:

|  | Commercial | Ex 1 | Ex 4 |
| --- | --- | --- | --- |
| Diam, micron | 15 | 10 | 12 |
| Tensile Strength |  |  |  |
| psi | 200,000 | 180,000 | 200,000 |
| mPa | 1380 | 1240 | 1360 |
| Alkali Durability | 4–5 | 2.15 | not run |
| % wgt loss, 1.25 N NaOH, 90° C., 72 hrs |  |  |  |
| SIC Test (80° C.) |  |  |  |
| Strength in mPa after |  |  |  |
| 20 hrs | 900 | 500 | 1100 |
| 60 hrs | 650 | 600 | 1000 |

[1]CEM-FIL II, Pilkington Bros. Ltd., St. Helens, England
[2]ASTM-D3379-75(1976) method using an Instron apparatus with special load cell
[3]modified ASTM-C225-73 method (Rothermal et al, Bull. Am. Ceram. Soc., 31, 324 (1952))
[4]Single fibers were placed in a wet cement paste at pH 12.1 prepared by mixing Portland cement powder with water. The paste with fibers were held for 2 hours in a high-temperature cabinet at 80° C., then for 20 hours and 60 hours at room temperature. The fibers were then carefully removed from the cement and tested for tensile strength as in (2).

EXAMPLE 6

The procedure of Example 1 was repeated using a mixture equivalent to, by weight, 56.6% $SiO_2$, 14.7%

MgO, 14.9% CaO, 5.4% Al₂O₃, 3.2% B₂O₃ and 5.3% Ta₂O₅, at a molten glass temperature of 1240° C., resulting in a continuous, monofilament, alkali-resistant fiber of 10 micron diameter.

We claim:

1. An alkali-resistant glass material produced by a process comprising the steps of heating a mixture comprising a magnesium silicate and a calcium oxide-containing compound, or a calcium silicate and a magnesium oxide-containing compound to a temperature above the liquidus temperature of the mixture to form a viscous liquid; drawing the viscous liquid to form a fiber; and cooling the fiber to a temperature below the liquidus temperature of the mixture; the resulting fiber consisting essentially of, in approximate weight percent:

|  |  |
|---|---|
| $SiO_2$ | 30–65 |
| MgO | 12–18 |
| CaO | 12–18 |
| Minor Oxides | 5–20 | the minor oxides being selected from $R_2^a O$, $R^b O$, $R_2^c O_3$, $R^d O_2$ and $R_2^e O_5$, wherein $R^a$ = Li, K, Na,
$R^b$ = Ba, Cd, Pb, Sr,
$R^c$ = Al, B,
$R^d$ = Ce, Sn, Ti,
$R^e$ = Sb, Nb, P, Ta, and wherein a single minor oxide is present in an amount up to about 10 weight percent of the glass.

2. The alkali-resistant glass material accorrding to claim 1 which is a continuous monofilamentous fiber.

3. The alkali-resistant glass material according to claim 2 wherein the fiber is formed by drawing the viscous liquid through an orifice.

4. The alkali-resistant glass material according to claim 3 which is a strand formed from a plurality of cooled continuous fibers.

5. The alkali-resistant glass material according to claim 4 wherein the strand comprises from 100 to 200 individual fibers.

6. The alkali-resistant glass material according to claim 2 wherein the continuous fiber is a monofilamentous fiber of essentially constant diameter and unlimited length.

7. The alkali-resistant glass material according to claim 6, wherein the continuous fiber has a nominal diameter of from about 2 to 50 microns.

8. The alkali-resistant glass material according to claim 7, wherein the continuous fiber has a nominal diameter of from 10 to 20 microns.

9. The alkali-resistant glass material according to claim 1 wherein the mixture contains from about 30 to 63 weight percent magnesium silicate, from 0 to about 45 weight percent silica, from about 21 to 45 weight percent calcium carbonate, and from about 5 to 20 weight percent of an oxide selected from lithium oxide, potassium oxide, sodium oxide, barium oxide, cadmium oxide, lead monoxide, strontium oxide, zinc oxide, alumina, boric oxide, ceric oxide, stannic oxide, titania, zirconia, antimony pentoxide, niobium pentoxide, phosphoric pentoxide, tantalum pentoxide, and combinations thereof wherein any single oxide from the group is added in a maximum amount of about 10 weight percent.

10. The alkali-resistant glass material according to claim 9 wherein the magnesium silicate is at least one of olivine, serpentine, forsterite, talc and mixtures thereof, the silica is a free silica or a mixture thereof, and the calcium carbonate is at least one of limestone, calcite, aragonite, dolomite, chalk, whiting and mixtures thereof.

11. The alkali-resistant glass material according to claim 10 wherein the magnesium silicate is talc, the silica is sand, and the calcium carbonate is limestone.

12. The alkali-resistant glass material according to claim 1 which is a glass wool fiber.

13. The alkali-resistant glass material according to claim 1 wherein the source of magnesium oxide is at least one of seawater magnesia, magnesium hydroxide, magnesium carbonate and magnesium silicate, and mixtures thereof.

14. The alkali-resistant glass material according to claim 1 wherein the source of calcium oxide is at least one of a naturally occurring for of calcium carbonate, wollastonite, calcium oxide, calcium hydroxide, and mixtures thereof.

15. The alkali-resistant glass material according to claim 1 wherein the liquidus temperature of the mixture is from about 900° C. to 1400° C.

16. The alkali-resistant glass material according to claim 1 wherein the mixture is heated to from about 100° C. to 200° C. above the liquidus temperature to effect melting of the mixture.

17. The alkali-resistant glass material according to claim 16 wherein the mixture is then cooled to a temperature above the liquidus temperature where the viscous liquid has a melt viscosity of from about 100 to 2000 poise.

18. The alkali-resistant glass material according to claim 1 wherein the viscous liquid is drawn into a fiber by extrusion through an orifice.

19. The alkali-resistant glass material according to claim 18 wherein the extrusion step is by gravity or pressure extrusion.

20. The alkali-resistant glass material according to claim 18 wherein the orifice has a diamter of from 2 to 10 millimeters.

21. The alkali-resistant glass material according to claim 1 wherein the drawn fiber is cooled to a temperature below the liquidus temperature of the mixture by a counter-currently flowing gas stream.

22. A fiber-reinforced cementitious product containing fibers of the alkali-resistant glass material of claim 1.

23. The fiber-reinforced cementitious product of claim 22 wherein the fibers of the alkali-resistant glass material are present at a level of from about 1 to 20 weight percent of the cementitious product.

24. The fiber-reinforced cementitious product of claim 23 wherein the fibers of the alkali-resistant glass material are present at a level of from about 2 to 10 weight percent of the cementitious product.

25. An alkali-resistant glass material coated with a layer of an alkali-resistant polymer produced by a process comprising the steps of heating a mixture comprising a magnesium silicate and a calcium oxide-containing compound, or a calcium silicate and a magnesium oxide-containing compound to a temperature above the liquidus temperature of the mixture to form a viscous liquid; drawing the viscous liquid to form a fiber; cooling the fiber to a temperature below the liquidus temperature of the mixture; the resulting fiber consisting essentially of, in approximate weight percent:

| | |
|---|---|
| SiO$_2$ | 30–65 |
| MgO | 12–18 |
| CaO | 12–18 |
| Minor Oxides | 6–20 | the minor oxides being selected from R$_2^a$O, R$^b$O, R$_2^c$O$_3$, R$^d$O$_2$ and R$_2^e$O$_5$, wherein R$^a$=Li, K, Na,
R$^b$=Ba, Cd, Pb, Sr,
R$^c$=Al, B,
R$^e$=Sb, Nb, P, Ta, and wherein a single minor oxide is present in an amount up to about 10 weight percent of the glass; and coating the fiber with a layer of the alkali-resistant polymer.

26. The alkali-resistant glass material according to claim 25 which is a continuous monofilamentous fiber.

27. The alkali-resistant glass material according to claim 7 wherein the alkali-resistant polymer is ethylene-vinyl chloride co-polymer or butadiene-styrene co-polymer.

28. The alkali-resistant glass material according to claim 25 wherein the fiber is coated with a layer of alkali-resistant polymer by passing the fiber over a sponge saturated with a solution of the polymer and then allowing the solvent of the solution to evaporate and the polymer to cure.

29. The alkali-resistant glass material according to claim 28 wherein the polymer coating is from 2 to 20 weight percent of the coated fiber and has a thickness of from about 0.2 to 2.0 microns.

30. The alkali-resistant glass material according to claim 25 wherein a sizing agent is applied to the fiber prior to coating the fiber with a layer of the alkali-resistant polymer.

31. A fiber-reinforced cementitious product containing alkali-resistant-polymer-coated fibers of the alkali-resistant glass material of claim 7.

32. The fiber-reinforced cementitious product of claim 31 wherein the alkali-resistant-polymer-coated fibers of the alkali-resistant glass material are present at a level of from about 1 to 20 weight percent of the cementitious product.

33. The fiber-reinforced cementitious product of claim 32 wherein the alkali-resistant-polymer-coated fibers of the alkali-resistant glass material are present at a level of from about 2 to 10 weight percent of the cementitious product.

* * * * *